Jan. 16, 1951 R. E. PHELON 2,538,534
ROTOR FOR FLYWHEEL MAGNETO AND MAGNET UNIT THEREFOR
Filed May 19, 1948
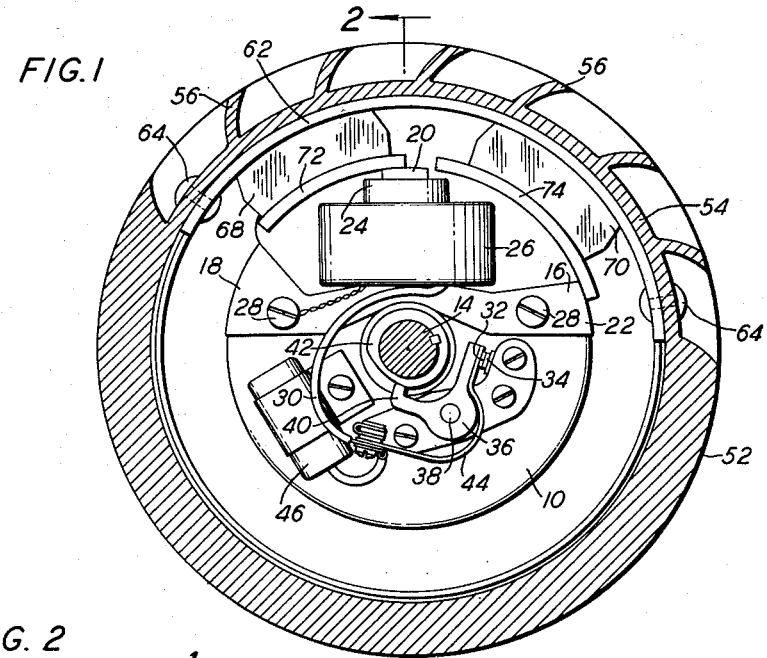
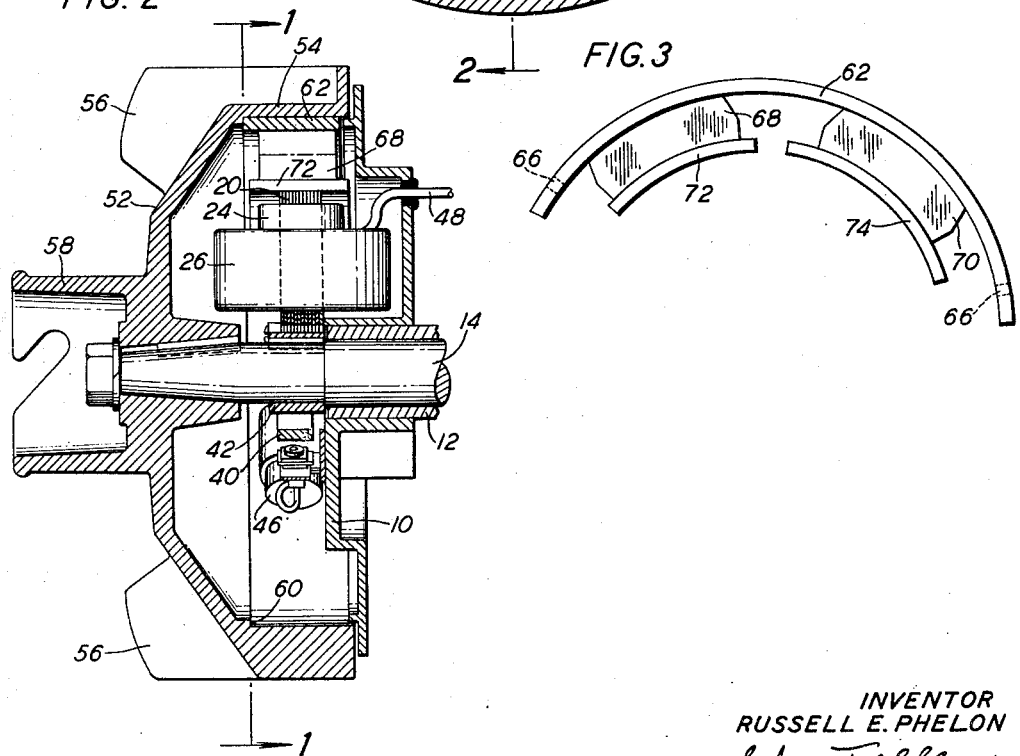
INVENTOR
RUSSELL E. PHELON
BY S. Jay Teller
ATTORNEY Patented Jan. 16, 1951

2,538,534

UNITED STATES PATENT OFFICE 2,538,534

ROTOR FOR FLYWHEEL MAGNETO AND MAGNET UNIT THEREFOR

Russell E. Phelon, West Springfield, Mass.

Application May 19, 1948, Serial No. 27,885

10 Claims. (Cl. 171—209)

1

The invention relates to a rotor for a high tension magneto of the flywheel type such as is commonly used with an internal combustion engine. More particularly, the invention relates to a separate magnet unit adapted for use with the flywheel of the rotor of a magneto of the said type.

My copending application for Flywheel Magneto, Serial No. 676,413, filed June 13, 1946, now Patent 2,472,313, issued June 7, 1949, discloses a flywheel magneto which includes a rotor having many of the characteristics of the rotor embodying the present invention. The principal object of the present invention is to provide a magnet unit which is structurally separate from the main body of the flywheel and which when combined with the flywheel incorporates the principles of the prior invention. Magnet units embodying the present invention may be manufactured and sold as separate articles, these being adapted to be thereafter incorporated in complete magnetos.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing:

Fig. 1 is a transverse vertical sectional view taken along the line 1—1 of Fig. 2, this view showing a magneto having a rotor which includes a separate magnet unit in conformity with the invention.

Fig. 2 is a longitudinal vertical sectional view taken along the line 2—2 of Fig. 1.

Fig. 3 is a front view of the separate magnet unit.

The rotor and the magnet unit thereof embodying the invention may vary widely as to structural details and may be used in magnetos differing as to various features. In order that the invention may be clearly understood I have shown a particular magneto in the drawing and a particular rotor and magnet unit therefor, but the drawing is intended to be merely illustrative.

The core structure of the magneto is nonrotatable and as shown in the drawing, it is carried by a frame 10 having a bushing 12 which provides a bearing for a rotatable shaft 14. The shaft 14 may be an extension of the crankshaft of the engine with which the magneto is to be used, and in any event it is rotated in timed relationship with the engine. The core structure

2 comprises a magnetic core 16 preferably laminated and arranged to provide a plurality of circularly spaced poles having arcuate faces which are concentric with the axis of the shaft 14 and equidistant therefrom. The poles of the core structure are all within an arc of approximately 180° or less and are ordinarily at one side of a diametral plane through the axis of the shaft. Primary and secondary generating coils surround one of the poles. As shown the core structure has three poles 18, 20 and 22, and primary and secondary coils 24 and 26 surround the intermediate pole 20. The primary coil has a relatively small number of turns, as for instance 176, and the secondary coil has a relatively large number of turns, as for instance 10,000.

The primary coil 24 is suitably grounded, for instance by being connected to one of the screws 28, 28 which hold the core 16 in place on the frame 10. The ungrounded end of the primary coil is connected by means of an insulated conductor 30 with breaker points 32 and 34. The point 34 is grounded and the point 32 is carried by a rocker arm 36 pivoted at 38 to the frame 10. The rocker arm 36 has an extension 40 which is engaged by a cam 42 mounted on the shaft 14. A spring 44 serves to bias the arm 36 to move the point 32 into engagement with the point 34, and this spring, or an auxiliary conductor associated therewith, serves to provide an electrical connection between the conductor 30 and the said point 32. When the shaft 14 is rotated the cam 42 oscillates the rocker arm 36 to make and break the electrical connection between the points 32 and 34. A condenser 46 is connected in parallel with the breaker points 32 and 34 in accordance with customary practice.

The secondary coil 26 is suitably grounded, for instance by being connected with the same screw 28 which is used for grounding the primary coil. The secondary coil is provided at its ungrounded end with an insulated conductor 48 which extends to the spark plug of the engine.

The rotatable field structure of the magneto includes a flywheel 52 which is connected with the shaft 14 so as to be rotatable therewith. The flywheel is preferably formed of magnetic material, but it may less advantageously be formed of non-magnetic material. When the flywheel is formed of magnetic material magnetic insulation is preferably provided between the flywheel and the stationary core structure. Such magnetic insulation may be provided by utilizing a non-magnetic material for the frame 10 which supports the stationary core structure.

The flywheel 52 may differ widely as to details.

It is shown as having a disc-like outer wall carrying an annular flange 54 which surrounds the before-described core structure. The flywheel as illustrated has integral blades 56 adapted to cooperate with a housing, not shown, to provide a circulation of air. The flywheel also has an extension 58 adapted to be engaged by a crank for starting the engine. The inner as internal face of the annular flange 54 is preferably cylindrical and is provided with an annular shoulder 60.

The magnet unit to which the invention more particularly relates includes a connecting member 62 which is formed of magnetic material. When the inner face of the flange 54 of the flywheel is cylindrical, the connecting member 62 is a segment or portion of a cylinder concentric with the flywheel axis. The cylindrical segment or portion extends through an arc of less than 180°. The connecting member 62 terminates laterally at generally parallel faces perpendicular to the axis of rotation, and the said connecting member is preferably rectangular in cross section. One of the last said lateral faces cooperates with the exterior cylindrical face of the member 62 to provide a circumferentially extending corner. The ends of the segment or portion are generally perpendicular to the aforesaid parallel side faces thereof. The connecting member is adapted to be secured to and carried by the flywheel and when the flange of the flywheel has an inner cylindrical face, the outer face of the connecting member is engaged therewith. The aforesaid circumferentially extending corner of the connecting member engages the flywheel shoulder 60. The connecting member may be secured in place by any suitable means, such as rivets 64, 64 extending through holes in the rim of the flywheel and through holes 66, 66 in the end portions of the connecting member.

Carried by the connecting member 62 is at least one radially extending member of homogeneous magnetic material and ordinarily there are two such members 68 and 70. At least one of the members is a radially charged magnet and ordinarily both of the members are magnets. The magnets are formed from a special alloy having a high coersive force. The outer extremities of the members or magnets directly engage the internal face of the connecting member 62, the said members or magnets being respectively adjacent the transverse ends of the said connecting member and the said members or magnets being arcuately spaced to cooperate with the relatively closely spaced poles of the core 16. The spacing is such that the two members or magnets can register simultaneously with the intermediate pole of the core structure and with one of the other poles thereof. The magnets are preferably somewhat narrower than the connecting member 62.

As stated, at least one of the members 68 and 70 is a magnet, and means are provided which are connected with the inner extremity of the magnet and with the connecting member 62 for providing two circularly spaced pole faces of opposite polarity which are movable in close proximity to the outer faces of the poles of the core structure and which are arcuately spaced to cooperate with the said poles. As shown, both of the members 68 and 70 are magnets which are oppositely charged radially or in directions perpendicular to the connecting member and the said magnets therefore have opposite polarity. The said means for providing pole faces of opposite polarity are pole pieces 72 and 74 carried respectively by the magnets at the inner extremities thereof. The pole pieces preferably have approximately the same width as the connecting member 62, being somewhat wider than the magnets and projecting axially beyond them. The inner faces of the pole pieces are arcuate and when the connecting member is secured to the flywheel as described the said faces are concentric with the axis of the shaft and are so spaced therefrom as to be adapted to move in close proximity to the pole faces 18, 20 and 22 of the core 16. It will be seen that a magnetic circuit is established through the said magnets and their pole pieces and also through the connecting member 62. For reasons to be explained the pole pieces 72 and 74 preferably project circularly beyond the magnets. The requirement is for only a single magnetic circuit having two inner pole faces of opposite polarity. The space between the magnets is therefore magnetically unobstructed, that is, it does not contain any other magnet or any body of magnetic material which would interfere with the desired single magnetic circuit.

The members or magnets 68 and 70 and their pole pieces 72 and 74 may be connected with the connecting member 62 by mechanical connecting means, such as rivets, but I prefer to connect them by brazing or soldering. The magnets are brazed or soldered to the connecting member 62 and the pole pieces are brazed or soldered to the magnets. The magnets have a critical temperature above which they cannot be heated without damage, but by using a suitable solder, such as a silver-copper alloy, and by closely controlling the temperature, soldering can be effected without damage.

The flywheel 52 is formed to provide a counterbalance for the magnet unit that has been described. When the flywheel has blades such as 56, the areas of the spaces between the blades at a sector opposite the magnet unit are smaller than the areas of the spaces between the remaining blades in the sector adjacent the said unit, such areas being in longitudinal planes through the axis of rotation as shown in Fig. 2. Specifically, the metal of the flange 54 may be increased in thickness between the blades at the said opposite sector as indicated in Figs. 1 and 2. This increased thickness of the flange 54 provides the necessary counterweight for the magnet unit.

With the flywheel 52 formed of magnetic material, the connecting member 62 is relatively thin, the main body of the flywheel cooperating with the connecting member to provide the required magnetic circuit. The connecting member serves primarily to mechanically connect the spaced members or magnets, the major portion of the magnetic circuit being established through the main body of the flywheel. Therefore each magnet has a minimum cross sectional area perpendicular to the direction of charging which is substantially greater than the transverse across sectional area of the connecting member between the spaced members or magnets. As shown, the cross sectional area of each magnet is about eight times the cross sectional area of the connecting member.

When the rotor including the flywheel and the magnet unit rotates in the clockwise direction the leading pole piece 74, before reaching the position shown in Fig. 1, registers with the intermediate pole 20 of the core 16 and at the same instant the trailing pole piece 72 registers with the left pole 18 of the core 16, thus establishing a magnetic circuit through the center pole in one direction. As the rotor reaches the position shown in Fig. 1 the leading pole piece 74 leaves the intermediate pole 20 and comes into register with the right pole 22 of the core 16. At the same instant the trailing pole piece 72 leaves the left pole 18 and comes into register with the intermediate pole 20. At this instant the direction of the magnetic circuit through the center pole 20 is suddenly reversed and a maximum value of voltage is generated in the primary coil 24. The cam 42 is so positioned as to separate the breaker point 32 and 34 at the instant of maximum voltage in the primary coil, thus generating a high voltage in the secondary coil 26 which is connected with the spark plug1 of the engine.

In a high tension magneto it is generally desirable to maintain a relatively high remanence of flux in the magnets. In a design such as the one described this is particularly desirable because of the short length in the radial direction of the magnets relative to the area in cross section at right angles to the radial direction. This high remanence is maintained by providing adequate leakage of the flux during the portion of the rotation of the rotor when the pole pieces are not in register with the core faces. Flux leakage is in proportion to the area of the air gap between oppositely charged surfaces. For this reason the pole pieces 72 and 74 project either axially or circularly, and preferably both axially and circularly, beyond their magnets, thus providing a larger area of air gap between one pole piece and the other oppositely charged one, and between each pole piece and the oppositely charged connecting member 62. Magnetic leakage is also indirectly proportional to the length of the air gap. For this reason the oppositely charged pole pieces are extended towards each other to approach each other as closely as possible without interfering with the effective magnetic cooperation of the pole pieces with the faces of the poles of the stationary core.

The circular and axial projection of the pole pieces beyond their magnets is also highly important for facilitating manufacture. As has been stated, the pole pieces are brazed or soldered to the magnets and the projection of the pole pieces beyond the magnets provides exposed faces to which the brazing or soldering material can adhere.

The magnets 68 and 70 are arcuately spaced from each other to an extent greater than the width of the intermediate pole 20 of the core structure, and the pole pieces 72 and 74 project toward each other to such an extent that the width of the gap between them is less than the width of the said intermediate pole 20. Thus the spacing of the magnets is such that they cannot register simultaneously with the said intermediate pole, but the pole pieces on the magnets can register simultaneously with the said pole so as to provide a sudden reversal in the magnetic circuit through the said pole. As shown, the two magnets are of substantially the same size, but the leading pole piece 74 projects circularly beyond the leading magnet 70 to relatively large extents and the trailing pole piece projects circularly beyond the trailing magnet 68 to smaller extents. The said leading magnet 70 has a circular width which is less than the spacing between the intermediate core pole 20 and the forward core pole 16. The extents of circular projection of the pole piece 74 are such that the said pole piece can simultaneously register with both of the last said core poles.

As has been stated, holes 66, 66 are provided in the member 62 for receiving attaching devices such as the rivets 64, 64. In order that the said holes may be accessible from the inner face of the connecting member, the said member is of such length that the magnets are arcuately spaced from the said holes. Furthermore, the spacing is such that the arcuately projecting portions of the pole pieces 72 and 74 do not obstruct the said holes but on the contrary leave them accessible.

It will be seen that a magnet unit such as shown and described can be manufactured and sold separately from the magneto in its entirety and separately from the flywheel. This makes it possible for a magneto manufacturer to purchase the magnet units ready for installation, thus avoiding all difficulties and problems incident to the design and manufacture of the said units.

What I claim is:

1. In a rotor for a flywheel magneto, the combination of a rotatable flywheel having an internal face concentric with the axis of rotation and having integral air circulating blades, the spaces between the blades at one sector being smaller than the spaces between the remaining blades so as to provide a counterweight at the said sector, an arcuate connecting member separate from the flywheel and formed of magnetic material and constituting an incomplete portion of a hollow cylinder, the external face of the connecting member conforming to and being engaged with the internal face of the flywheel and the said connecting member being positioned opposite the said counterweight, two arcuately spaced permanent magnets of homogeneous material which are structurally separate from the connecting member and which are directly connected at their outer extremities with the internal face of the said connecting member, the said magnets being oppositely charged radially, and two arcuately spaced pole pieces which are structurally separate from the magnets and which are directly connected with the inner extremities of the respective magnets, the said pole pieces having arcuate inner faces which are concentric with the axis of rotation and the said pole pieces cooperating with the magnets and with the connecting member to provide a magnetic circuit having inner pole faces of opposite polarity.

2. In a rotor for a flywheel magneto, the combination of a rotatable flywheel formed of magnetic material and having an arcuate internal face concentric with the axis of rotation, a thin connecting member structurally separate from the flywheel and formed of magnetic material and having transverse ends spaced apart by an arc of less than 180°, the connecting member having outer and inner faces and the outer face being arcuate and directly engaging and fitting the arcuate internal face of the flywheel, two arcuately spaced members of homogeneous magnetic material which have a magnetically unobstructed space between them and which are directly connected at their outer extremities with the inner face of the connecting member respectively adjacent the transverse ends of the said member, at least one of the said spaced members being a permanent magnet charged radially and having a minimum cross sectional area perpendicular to the direction of charging which is substantially greater than the transverse cross sectional area of the connecting member between the said spaced members, and two arcuately spaced pole pieces of magnetic material having outer and inner faces and the inner faces being arcuate and concentric with the axis of rotation, the said pole pieces being directly connected at their outer faces with the inner extremities of the respective spaced members and cooperating with the said spaced members and with the said connecting member and with the said flywheel to provide a magnetic circuit having inner pole faces of opposite polarity.

3. In a rotor for a flywheel magneto, the combination of a rotatable flywheel formed of magnetic material and having an arcuate internal face concentric with the axis of rotation, a thin arcuate connecting member structurally separate from the flywheel and formed of magnetic material and constituting a segment of a hollow cylinder having transverse ends spaced apart by an arc of less than 180°, the outer face of the connecting member being directly engaged with the internal face of the flywheel, two arcuately spaced members of homogeneous material which have a magnetically unobstructed space between them and which are directly connected at their outer extremities with the internal face of the connecting member respectively adjacent the transverse ends of the said member, at least one of the said spaced members being a permanent magnet charged radially and having a minimum cross sectional area perpendicular to the direction of charging which is substantially greater than the transverse cross sectional area of the connecting member between the said spaced members, and two arcuately spaced thin pole pieces of magnetic material having arcuate outer and inner faces which are concentric with the axis of rotation, the said pole pieces being directly connected at their outer faces with the inner extremities of the respective spaced members and projecting arcuately beyond them to provide a narrow magnetic gap and the said pole pieces cooperating with the said spaced members and with the said connecting member and with the said flywheel to provide a magnetic circuit having inner pole faces of opposite polarity.

4. In a rotor for a flywheel magneto, the combination of a rotatable flywheel formed of magnetic material and having an arcuate internal face concentric with the axis of rotation, a thin arcuate connecting member structurally separate from the flywheel and formed of magnetic material and constituting a segment of a hollow cylinder having transverse ends spaced apart by an arc of less than 180°, the outer face of the connecting member being directly engaged with and fitting the internal face of the flywheel, two arcuately spaced permanent magnets of homogeneous material which have a magnetically unobstructed space between them, the said magnets being directly connected at their outer extremities with the internal face of the connecting member respectively adjacent the transverse ends of the said member and the said magnets being oppositely charged radially, and two arcuately spaced thin pole pieces structurally separate from the magnets and formed of magnetic material which pole pieces have arcuate outer and inner faces concentric with the axis of rotation, the said pole pieces being directly connected at their outer faces with the inner extremities of the respective magnets and projecting arcuately beyond the said magnets to provide a narrow magnetic gap and the said pole pieces cooperating with the said magnets and with the said connecting member and with the said flywheel to provide a magnetic circuit having inner pole faces of opposite polarity.

5. In a rotor for a flywheel magneto, the combination of a rotatable flywheel formed of magnetic material and having an arcuate internal face concentric with the axis of rotation, a thin arcuate connecting member structurally separate from the flywheel and formed of magnetic material and constituting a segment of a hollow cylinder having transverse ends spaced apart by an arc of less than 180°, the outer face of the connecting member being directly engaged with and fitting the internal face of the flywheel, two arcuately spaced permanent magnets of homogeneous material which have a magnetically unobstructed space between them and which are directly connected at their outer extremities with the internal face of the connecting member respectively adjacent the transverse ends of the said member, the said magnets being oppositely charged radially and each magnet having a minimum cross sectional area perpendicular to the direction of charging which is substantially greater than the transverse cross sectional area of the connecting member between the magnets, and two arcuately spaced thin pole pieces structurally separate from the magnets and formed of magnetic material which pole pieces have arcuate outer and inner faces concentric with the axis of rotation, the said pole pieces being directly connected at their outer faces with the inner extremities of the respective magnets and projecting arcuately beyond the said magnets to provide a narrow magnetic gap and the said pole pieces cooperating with the said magnets and with the said connecting member and with the said flywheel to provide a magnetic circuit having inner pole faces of opposite polarity.

6. A magnet unit adapted for use with a magneto flywheel formed of magnetic material and having an internal cylindrical face, the said unit comprising in combination a thin connecting member formed of magnetic material and having outer and inner faces with the said outer face cylindrical and adapted to engage with and fit the said internal flywheel face, the said connecting member having transverse ends which are spaced apart by an arc of less than 180°, two similar arcuately spaced members of homogeneous material which have a magnetically unobstructed space between them and which are directly connected at their outer extremities to the inner face of the connecting member respectively adjacent the said transverse ends of the said member, at least one of the said spaced members being a permanent magnet charged radially and having a minimum cross sectional area perpendicular to the direction of charging substantially greater than the transverse cross sectional area of the connecting member between the magnets, and two arcuately spaced pole pieces of magnetic material having outer and inner faces and the inner faces being arcuate and concentric with the outer cylindrical face of the connecting member, the said pole pieces being directly connected at their outer faces with the inner extremities of the respective spaced members and projecting arcuately beyond them to provide a narrow magnetic gap and the said pole pieces cooperating with the said magnets and with the said connecting member and with the said flywheel, when the connecting member is engaged therewith, so as to provide a magnetic circuit having inner pole faces of opposite polarity.

7. A magnet unit adapted for use with a magneto flywheel formed of magnetic material and having an internal cylindrical face, the said unit comprising in combination a thin arcuate connecting member formed of magnetic material and having outer and inner concentric cylindrical faces with the said outer face adapted to engage with and fit the said internal flywheel face, the said connecting member having transverse ends which are spaced apart by an arc of less than 180°, two similar arcuately spaced permanent magnets of homogeneous material which have a magnetically unobstructed space between them, the said magnets being directly connected at their outer extremities with the internal face of the connecting member respectively adjacent the transverse ends of the said member and the said magnets being oppositely charged in directions perpendicular to the connecting member, and two arcuately spaced thin pole pieces structurally separate from the magnets and formed of magnetic material which pole pieces have outer and inner cylindrical faces concentric with the cylindrical faces of the connecting member, the said pole pieces being directly connected at their said outer faces to the inner extremities of the respective magnets and projecting arcuately beyond the said magnets to provide a narrow magnetic gap and the said pole pieces cooperating with the said magnets and with the said connecting member and with the flywheel, when the connecting member is engaged therewith, so as to provide a magnetic circuit having inner pole faces of opposite polarity.

8. A magnet unit adapted for use with a magneto flywheel formed of magnetic material and having an internal cylindrical face, the said unit comprising in combination a thin arcuate connecting member formed of magnetic material and having outer and inner concentric cylindrical faces with the said outer face adapted to engage with and fit the said internal flywheel face, the said connecting member having transverse ends which are spaced apart by an arc of less than 180°, two similar arcuately spaced permanent magnets of homogeneous material which have a magnetically unobstructed space between them and which are directly connected at their outer extremities to the inner face of the arcuate connecting member respectively adjacent the said transverse ends of the said member, the said magnets being charged oppositely in directions perpendicular to the connecting member and each magnet having a minimum cross sectional area perpendicular to the direction of charging which is substantially greater than the transverse cross sectional area of the connecting member between the magnets, and two arcuately spaced thin pole pieces structurally separate from the magnets and formed of magnetic material which pole pieces have outer and inner cylindrical faces concentric with the cylindrical faces of the connecting member, the said pole pieces being directly connected at their said outer faces to the inner extremities of the respective magnets and projecting arcuately beyond the said magnets to provide a narrow magnetic gap and the said pole pieces cooperating with the said magnets and with the said connecting member and with the flywheel, when the connecting member is engaged therewith, so as to provide a magnetic circuit having inner pole faces of opposite polarity.

9. A magnet unit as set forth in claim 8, wherein the connecting member and the pole pieces have substantially the same width and wherein the magnets have a width substantially less than the said width of the connecting member and pole pieces and are spaced from the edges of the said connecting member and pole pieces.

10. A magnet unit adapted for use with a magneto flywheel formed of magnetic material and having an internal cylindrical face, the said unit comprising in combination a thin arcuate connecting member formed of magnetic material and having outer and inner concentric cylindrical faces with the said outer face adapted to engage with and fit the said internal flywheel face, the said connecting member having transverse ends which are spaced apart by an arc of less than 180° and the said member having holes therethrough near its ends for receiving attaching devices, two similar arcuately spaced permanent magnets of homogeneous material which have a magnetically unobstructed space between them and which are directly connected at their outer extremities to the inner face of the arcuate connecting member respectively adjacent but spaced from the said transverse ends of the said member and also spaced from the said attachment holes therein, the said magnets being charged oppositely in directions perpendicular to the connecting member, and two arcuately spaced thin pole pieces structurally separate from the magnets and formed of magnetic material which pole pieces have outer and inner cylindrical faces concentric with the cylindrical faces of the connecting member, the said pole pieces being directly connected at their said outer faces to the inner extremities of the respective magnets and projecting arcuately in both directions beyond the said magnets and the extent of projection toward the said attachment holes being such that the said holes are accessible at the inner face of the connecting member.

RUSSELL E. PHELON.

REFERENCES CITED

The following references are of record in the file of this patent:

UNITED STATES PATENTS

| Number | Name | Date |
| --- | --- | --- |
| 2,059,886 | Merrill | Nov. 3, 1936 |
| 2,062,938 | Ruppe | Dec. 1, 1936 |
| 2,421,301 | Swisher | May 27, 1947 |

FOREIGN PATENTS

| Number | Country | Date |
| --- | --- | --- |
| 391,379 | Great Britain | Apr. 27, 1933 |
| 90,495 | Sweden | July 30, 1935 |